US012639588B2

(12) United States Patent     (10) Patent No.: US 12,639,588 B2

Mukherjee     (45) Date of Patent: May 26, 2026

---

(54) AUTOMONOUS DIGITAL TWIN GENERATION USING EDGE-NODES

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 754 days.

(21) Appl. No.: 18/078,453

(22) Filed: Dec. 9, 2022

(65) Prior Publication Data

US 2024/0193439 A1    Jun. 13, 2024

(51) Int. Cl.
   *G06N 5/022*      (2023.01)

(52) U.S. Cl.
   CPC ................................... *G06N 5/022* (2013.01)

(58) Field of Classification Search
None
See application file for complete search history.

(56) References Cited

U.S. PATENT DOCUMENTS

| | | | |
|---|---|---|---|
| 10,922,091 B2 * | 2/2021 | Hanaoka | G06F 15/16 |
| 2020/0364387 A1 * | 11/2020 | Roemerman | G06F 30/20 |
| 2021/0051177 A1 * | 2/2021 | White | H04L 67/56 |
| 2022/0076151 A1 * | 3/2022 | Loesch | G06F 16/9024 |
| 2022/0318657 A1 * | 10/2022 | Liu | G06N 20/00 |

FOREIGN PATENT DOCUMENTS

| | | | | |
|---|---|---|---|---|
| CN | 114270282 A | * | 4/2022 | ............. G06F 30/27 |
| KR | 20220081880 A | * | 6/2022 | ............. G06N 20/00 |
| WO | WO-2016183229 A1 | * | 11/2016 | ......... G06Q 30/0283 |

OTHER PUBLICATIONS

Krishnan, Prabhakar, Kurunandan Jain, Rajkumar Buyya, Pandi Vijayakumar, Anand Nayyar, Muhammad Bilal, and Houbing Song. "MUD-based behavioral profiling security framework for software-defined IoT networks." IEEE Internet of Things Journal 9, No. 9 (2021): 6611-6622. (Year: 2021).*

Wang, Ziran. "Mobility digital twin with connected vehicles and cloud computing." Authorea Preprints (2021). (Year: 2021).*

Yi, Shanhe, Zhengrui Qin, and Qun Li. "Security and privacy issues of fog computing: A survey." International conference on wireless algorithms, systems, and applications. Cham: Springer International Publishing, 2015. (Year: 2015).*

Zhou, Qizhao, and Zhongyu Shi. "Digital Twin Empowered Predictive Task Offloading Framework for Vehicular Fog/Edge Computing." Edge Computing. No Date.*

* cited by examiner

*Primary Examiner* — Uyen T Le

(74) *Attorney, Agent, or Firm* — Weiss & Arons LLP

(57) ABSTRACT

Apparatus and methods for building a digital twin of a datacenter using edge-node computing is provided. Edge-nodes may collect telemetry data points from different infrastructure components of the datacenter. An AI engine may be configured to create a digital twin of the datacenter based on the data points captured by the edge-nodes. The digital twin may be segmented into a plurality of layers, and each layer may represent a different logical layer of the datacenter. Utilizing edge-nodes to capture data points may prevent overloading components of the datacenter and generate a digital twin for any suitable layer (physical or virtual) of datacenter.

8 Claims, 4 Drawing Sheets

DATA CENTER POWER CONSUMPTION WITH CONVENTIONAL DIGITAL TWINNING METHODS

DATA CENTER POWER CONSUMPTION WITH EDGE-NODE DIGITAL TWINNING METHODS

AUTOMONOUS DIGITAL TWIN GENERATION USING EDGE-NODES

FIELD OF TECHNOLOGY

Aspects of the disclosure relate to building a digital twin of a technology infrastructure, such as a datacenter, using edge-node computing.

BACKGROUND OF THE DISCLOSURE

Computer systems play an integral role in the operations of nearly every enterprise across the globe. Large or small, enterprises rely on computer systems at all phases of their workflows. From communications and tracking to processing and record keeping, computer systems are the backbone of modern enterprises. Computer systems allow enterprises to provide access to information and services.

To provide fast, reliable and secure access to those information and services, an enterprise may centralize shared computational operations and equipment in a datacenter. These datacenters have evolved to house critical computational assets and reliable and consistent access to the datacenter is critical for daily operations of the enterprise. The datacenter may support the enterprise's data storage, backup and recovery services. The datacenter may support productivity applications such as email, messaging services, document management, word processors, intranet/internet services or e-commerce transactions.

Historically, datacenters have been highly secured and localized physical structures. With the recent proliferation of cloud-computing services, many datacenters are now virtual technology infrastructures that support cloud-based applications and associated computational tasks. However, even cloud-based virtual datacenters require physical space to house underlying datacenter equipment. The datacenter equipment may include hardware and software such as data storage systems, computer servers, network infrastructure (e.g., routers and switches) and information security devices (e.g., firewalls or other intrusion detection systems).

To maintain ongoing operation of equipment, a datacenter must be associated with a reliable electrical power system. A datacenter's annual power draw can range from a few kilowatts for a small datacenter to tens of megawatts for larger facilities. The equipment in the datacenter also generates heat, and environmental control systems are needed to maintain optimum operating conditions. Illustrative environmental control systems may include heating ventilation and air conditioning ("HVAC") systems, specialized computer room air conditioners and specialized exhaust systems.

To provide reliable and secure access to information and services, all datacenter equipment must be functioning and available round-the-clock. Datacenters with more than 99% uptime are considered "fault tolerant." As the availability percentage approaches 100% the more expensive it becomes to maintain availability. A difference in cost to achieving 99.9999% uptime ("high availability") versus achieving 99.9% uptime ("fault tolerance") can be substantial.

There are currently millions of datacenters around the world, and it is therefore desirable to provide methods for maintaining reliability and operational consistency of these datacenters. However, datacenters include complex technology infrastructures with many disparate yet interacting hardware and software components. It is therefore difficult to generate virtual models that accurately portray activity of equipment within the datacenter.

Additionally, virtual simulations of such complex technology infrastructure such as a datacenter may generate huge amounts of data, potentially even more data than a real-world datacenter would generate. It is technologically difficult to manage and analyze such volumes of data. Furthermore, generating a virtual model of a datacenter may impose costs on the datacenter. For example, servers and databases of the datacenter may need to process captured data, network equipment of the datacenter may be needed to route data points and additional power may be needed. These costs may degrade the overall performance of the datacenter with respect to its primary mission of reliably and consistently supporting an enterprise's applications and computational tasks.

To date, it has been technologically challenging to virtually model datacenters, simulate their operation, detect and remediate potential vulnerabilities or failure points. Therefore, conventional for methods ensuring datacenter reliability are still widely used. Such conventional methods include installation of redundant equipment that can be switched on in response to performance problems or any other failure.

For example, a redundant array of independent disks provides a resilient data storage solution. Uninterruptible power supplies, banks of backup batteries and generators provide a consistent and e backup power supply. Clustering is a process of linking many computer servers. Overall, clustering may achieve continuous, or 100% uptime.

However, such conventional methods are also associated with high costs. Clustering requires a relatively large number of duplicative computer systems to achieve 100% uptime. In addition to hardware costs, clustering requires additional software for the duplicative computer system, although physically distinct, to operate as a single logical system.

The costs for increased resiliency and reliability are even higher for datacenters that operate in complex enterprise environments. Large enterprises may utilize over 4,000 different software applications. Access to the different software applications may be controlled by a network of over 4,500 different computer servers. The large number of interconnected computer systems and associated software applications give rise to increasingly complex technology infrastructure and concomitant increased costs to maintain resiliency.

It would further be desirable to provide systems and methods for virtually modeling complex datacenter technology infrastructure. It would be desirable to provide apparatus and methods for generating manageable virtual simulations of a complex technology infrastructure like a datacenter without negatively impacting ongoing performance of the datacenter itself. It would further be desirable to utilize a virtual datacenter model to improve availability of datacenter equipment without the high costs associated with purchase and maintenance of duplicative equipment. It is therefore desirable to provide apparatus and methods for an AUTOMONOUS DIGITAL TWIN GENERATION USING EDGE-NODES.

BRIEF DESCRIPTION OF THE DRAWINGS

The objects and advantages of the disclosure will be apparent upon the consideration of following detailed description, taken in conjunction with the accompanying drawings, in which like reference characters refer to like parts throughout, and in which.

DETAILED DESCRIPTION

Figures 1, 2:
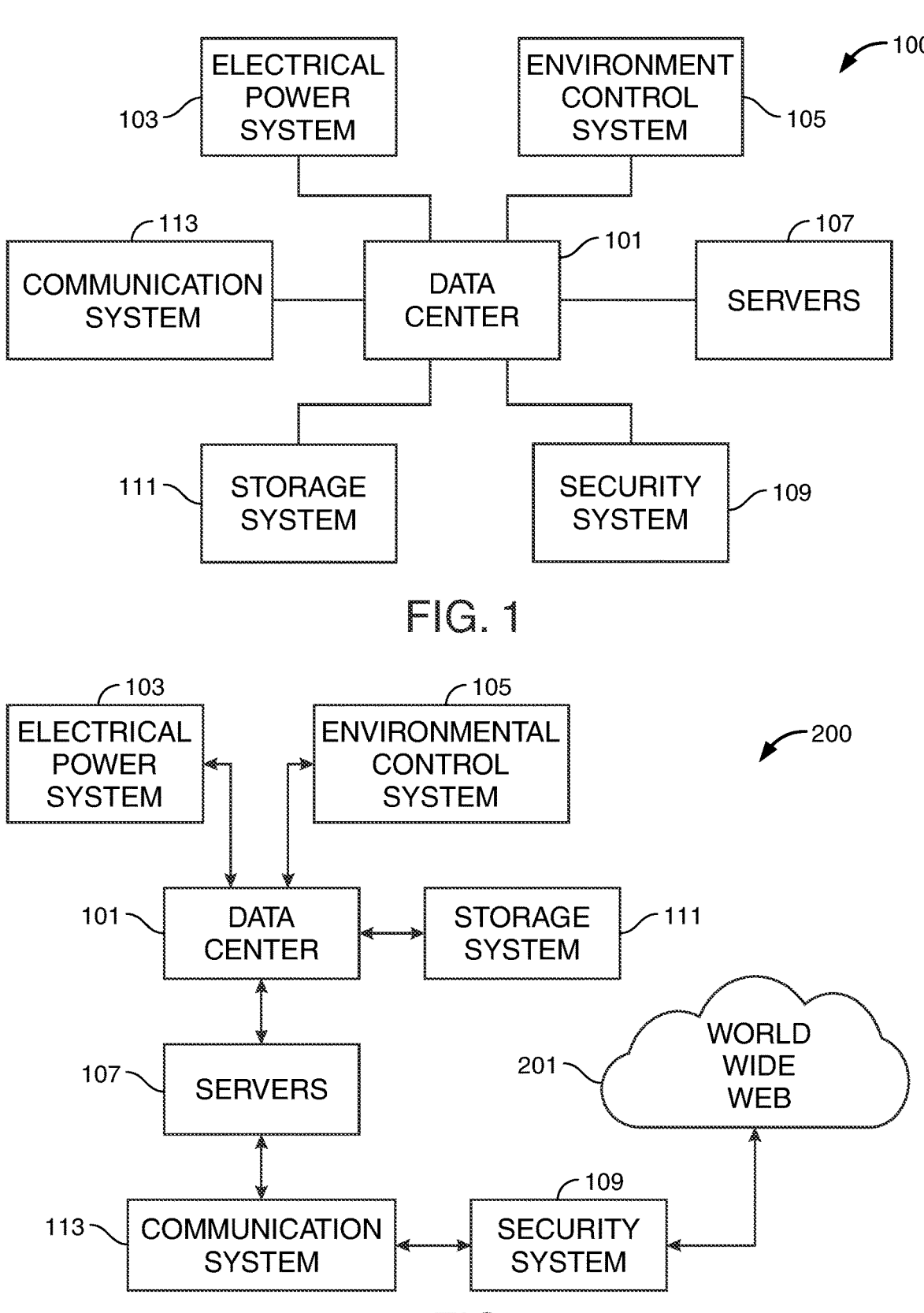
FIG. 1 shows an illustrative system in accordance with principles of the disclosure.
FIG. 2 shows an illustrative system in accordance with principles of the disclosure.

Apparatus and methods for building a digital twin of a datacenter using edge-node computing is provided. Edge-nodes may collect telemetry data from equipment of the datacenter. Illustrative equipment in a datacenter may include computing hardware, storage hardware and network hardware. Illustrative equipment in a datacenter may include power and environmental control systems. The edge-nodes may also collect data from software applications that operate using datacenter equipment.

The data points captured by the edge-nodes may be fed into an artificial intelligence ("AI") engine. The AI engine may include a computer server. The computer server may include a processor circuit. The processor circuit may control overall operation of the computer server and its associated components. The processor circuit may include hardware, such as one or more integrated circuits that form a chipset. The hardware may include digital or analog logic circuitry configured to perform any suitable (e.g., logical) operation.

A computer server may utilize computer-executable instructions, such as one or more software applications, executed by a processor. Software applications may provide instructions to the processor that enable the computer server to perform various functions. Exemplary software applications include an operating system, application programs, and an associated database.

Software applications may be stored within a non-transitory memory and/or other storage medium. Some or all of the computer executable instructions of the computer server may be embodied in hardware or firmware components of the server. Generally, software applications include routines, programs, objects, components, data structures, etc. that perform particular tasks or implement abstract data types.

Software applications may perform machine learning AI and deep machine learning AI. Machine learning AI may identify patterns in data points received from the edge-nodes and make decisions based on the detected patterns. Machine learning AI is typically used to predict future behavior. Machine learning AI improves each time the AI system receives new data points because new patterns may be discovered in the larger data set now available to the machine learning AI. Deep machine learning AI adapts when exposed to different patterns of data points. Deep machine learning AI may uncover features or patterns in data points that the deep machine learning AI was never specifically programmed to find.

The AI engine may utilize one or more machine learning algorithms. The machine learning algorithms may identify usage patterns of hardware or software equipment installed in a datacenter. The machine learning algorithms may generate models that reflect usage of hardware or software within the datacenter. Machine learning algorithms improve over time because the algorithms are programmed to learn from previous decisions. Illustrative machine learning algorithms may include AdaBoost, Naive Bayes, Support Vector Machine and Random Forests. An illustrative machine learning algorithm may include a neural network such as Artificial Neural Networks and Convolutional Neural Networks.

Generally, a neural network implements machine learning by passing an input through a network of neurons—called layers—and providing an output. The more layers of neurons that are included in the neural network, the "deeper" the neural network. A neural network learns from outputs flagged as erroneous and adapts its neuron connections such that the next time the neural network receives a particular input it generates a more relevant output.

To effectively provide relevant outputs, a neural network must first be trained by analyzing training data sets. An illustrative data set may include computational tasks performed by the primary computer system over a target time period. Neural networks learn from the training data sets and rearrange interconnection between layers of the network in response to processing the training data. The strength or weight of a connection between layers of the neural network can vary. A connection between two or more layers can be strong, weak or anywhere in between. A neural network may self-adapt by adjusting the strength of the connections among its layers to generate more accurate outputs.

The AI engine may operate in a networked environment. For example, the AI engine may support establishing network connections to one or more edge-nodes. Illustrative network connections may include a local area network ("LAN") and a wide area network ("WAN"), and may also include other networks. When used in a LAN networking environment, the AI engine may be connected to the LAN through a network interface or adapter. The AI engine may include a communication circuit. The communication circuit may include a network interface card or adapter.

When used in a WAN networking environment, the AI engine may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the AI engine may be operated in a client-server configuration to permit a user to retrieve web pages from a web-based server. Web browsers can be used to display and manipulate data on web pages.

Edge-nodes may be deployed to capture and monitor data points associated with any physical, virtual or software component of a datacenter. For example, edge-nodes may be deployed with a container layer or a virtual layer within a datacenter. Edge-nodes may also be deployed to capture data associated with target equipment such as a target server, target router or target switch. Utilizing edge-nodes may allow the AI engine to obtain data points from targeted equipment operating in a datacenter without imposing additional computational loads that impact overall operation of the datacenter.

An edge-node may be an independent component that does not otherwise provide datacenter functionality. An edge-node may include one or more features of a computer server. An edge-node may include System-on-a-Chip ("SoC") architecture and may be powerful enough to run operating systems and complex data analysis algorithms. An illustrative SoC may include a central processing unit ("CPU"), a graphics processing unit ("GPU"), memory, power management circuits, and communication circuit. Illustrative software applications for edge-nodes may include TinyOS, Linux, Contiki and RIOT.

Edge-nodes may provide computational resources positioned near the source of captured data or near a target operating environment. Processing data using edge-nodes may reduce the communication bandwidth needed to transmit data from an edge node to the AI engine. Edge-nodes may not be continuously connected to a network. Therefore, in addition to providing faster response time to sensed changes, processing data using edge-nodes may reduce communication bandwidth requirements and improve overall data transfer time within a datacenter network in which they operate.

Furthermore, less-frequent data transmissions may enhance security of data gathered by edge-nodes. Less-frequent data transfers may minimize expose of captured data points to a potential security threat. For example, transmitted data may be vulnerable to being intercepted enroute to the AI engine.

Edge-nodes may be tasked with decision-making capabilities. Edge-node may perform real-time data integration such as filtering captured data points (e.g., identifying and discarding non-essential elements), batching captured and desired data points and coordinating transmission of captured data points to the AI engine from other edge-nodes. Filtered non-essential data points may never be transmitted or stored in the AI engine, further reducing network bandwidth consumption and exposure to security threats.

An edge-node may detect changes in attributes of a physical or virtual operating environment of a datacenter. Each change may be a data point provided to the AI engine. For example, sensors may measure data points associated with datacenter operations such as incoming network traffic, information processed, outgoing network traffic, resource usage, power consumption or HVAC load.

Other illustrative data points that may be captured by an edge-node include performance of software applications. Data points associated with software performance may include how often certain functionality is used, start-up time, processing time, application crashes, usage statistics and user behavior.

The edge-nodes may collect different telemetry data points such as CPU and memory usage, CPU heat, disk swap (a swap disk/file or page file may include space used on a hard disk), electrical energy consumed, room heating/cooling, hot spots, overcooled areas, humidity and/or air flow. The captured data points may be collected from each component of a datacenter system (e.g., server, router, disk array, HVAC). The collection of data points may be automated using AppDynamics or SPLUNK tool. The data points may be captured without impacting operation of the particular component of the datacenter system being monitored.

The AI engine may receive data points captured by the edge-nodes. The edge-nodes may provide sensed data points to the AI engine via a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilobits/second.

Other exemplary wireless communication protocols may include Ethernet, Bluetooth, Wi-Fi, 3G, 4G, 5G and any other suitable wired or wireless broadband standards. Illustrative data ports of nodes may include hardware and/or software for receiving and/or transmitting data using any suitable communication pathway. Illustrative communication pathways utilized by the edge-nodes to communicate with the AI engine may include Wi-Fi, wired connections, Bluetooth, cellular networks, satellite links, radio waves, fiber optic or any other suitable medium for carrying signals.

Based on the data points received from edge-nodes, the AI engine may utilize machine learning algorithms to construct and operate a digital twin for one or more components of the datacenter. The digital twin may simulate operation of one or more of the components of the datacenter. The digital twin may simulate interaction between the different simulated components. For example, the digital twin may simulate operation of power and environmental control systems of the datacenter. The digital twin may simulate interaction of power and environmental control systems of the datacenter based on ongoing actual or simulated operation of one or more of the hardware components and/or software applications within the datacenter.

The AI engine may perform data analysis of operations simulated by the digital twin. Such analysis may include estimating data load capacity, data routing and data load balancing and management for a datacenter. The AI engine may provide forward looking analysis that improves efficiency and reduces costs associated with operation of equipment within the datacenter.

Data points captured by edge-nodes in a datacenter may be voluminous and complex (e.g., structured/unstructured and/or constantly changing). Traditional data processing application software may be inadequate to meaningfully process the voluminous and complex data (e.g., "big data"). The AI engine may employ software applications specially designed to process large volumes of state information ("big data analytics"). A digital twin constructed by the AI engine may replicate and simulate performance of the hardware and software components of the datacenter. The digital twin may be configured to simulate overall performance of the datacenter.

The digital twin may generally be a virtual, software-based representation that serves as the real-time digital counterpart of a physical object, system, or process. In the case of a datacenter, the digital twin may be used to simulate, validate, and/or understand different applications and their dependencies when running different components such as processors, memory cores, cloud services, load balancers, web servers, database servers, network servers, climate control systems and power systems.

The digital twin may simulate operation of the datacenter components. The digital twin may generate data points that reflect operational status of datacenter components and provide the AI engine with information about the physical and/or virtual operating environment of the datacenter. The data points generated by the digital twin due to simulating operation of datacenter components may also generate data points that signify occurrence an event. For example, the AI engine may apply analytical tools (e.g., big data analysis or machine learning algorithms) to detect, within the data points generated by the digital twin, occurrence of an event that triggers backup systems of the datacenter and how information is processed and routed within the datacenter in response to that event.

To generate the digital twin, the AI engine may detect and catalogue datacenter components. AI engine may detect and catalogue which datacenter components interact with each other to form a larger system utilized by the datacenter. The AI engine may detect and identify the datacenter components and systems based on data points received from one or more edge-nodes. The data points captured by the edge-nodes may embody a comprehensive view of systems, associated components and interactions between the systems of the datacenter.

For example, a datacenter may include components that are "off-the-shelf" components. These off-the-shelf components may form a foundational basis upon which the digital twin may be modeled. However, these off-the-shelf components may be modified to perform a specific task, a specific way within the datacenter. The edge-nodes may capture these specific configuration settings associated with any off-the-shelf components.

The AI engine may also be configured to detect, based on data points received from the edge-nodes, performance metrics associated with operation of datacenter components. Illustrative performance metrics may include memory utilization, central processing unit ("CPU") utilization, CPU heat, disk swap, processing speed, and/or transmission latency.

After constructing the digital twin, the AI engine may continue to capture data points corresponding to performance metrics that measure and analyze ongoing operation of the datacenter components. These data points may be continuously fed into the AI engine to monitor and improve ongoing simulations generated by the digital twin. Based on simulation of datacenter components by the digital twin, the AI engine may utilize machine learning algorithms to run predictive analytics and generate a potential modification to components of the datacenter.

The AI engine may simulate deployment of the potential modification within the datacenter using the digital twin. For example, the AI engine may generate a new digital twin that includes an additional component, removes a component or changes an operational setting of a component. In response to the digital twin showing that a potential modification exceeds a threshold probability score of achieving an improvement to datacenter operation, the AI engine may be configured to apply the recommended potential modification to the datacenter.

The AI engine may be configured to apply the modification to the datacenter in real-time. For example, the AI engine may change a routing table and redirect network traffic within a network layer of the datacenter. The AI engine may adjust containerization methods deployed in the datacenter by grouping different applications in different memory spaces on different servers running different operating systems.

As a further example, based on simulating performance of the datacenter using the digital twin, the AI engine may activate additional virtual servers and/or containers. Simulations generated by the digital twin may indicate that the datacenter will, within a target time window, be subject to a high computational load. By activating additional virtual servers and/or containers, the expected high computational load may be distributed across the original and the new virtual servers or containers. In such embodiments, the digital twin functions as a virtual load balancer. Additional virtual servers/containers may be dynamically created and collapsed depending on process usage detected or anticipated by the digital twin.

In some embodiments, the AI engine may include a graphical user interface ("GUI") accessible, via a secure login, to an operational engineer tasked with managing the datacenter. The AI engine may be further configured to display the digital twin as a three-dimensional rendition within the GUI. The three-dimensional rendition may, for example, represent one or more components of the datacenter, and may display the components as an interconnected graph comprising nodes and edges. The nodes may represent components and the edges may represent associations between other components in the datacenter. The GUI may also display performance metrics for each simulated component (e.g., upon selection of a node or when a cursor hovers over a node). The GUI may be configured to receive potential modifications as inputs from the AI engine or operational engineer.

In certain embodiments, the AI engine may be further configured to analyze the performance of the digital twin to identify a system or component of the datacenter that exceeds a threshold likelihood of failing within a predetermined time-period. The AI engine may act to ensure timely replacement of the system or component. For example, the AI engine may automatically submit an order for a replacement component to a supplier via an acquisition network and inform the operational engineer of a need to replace the component.

In certain embodiments, the AI engine may be further configured, in response to applying a modification to a datacenter component, to measure, via the digital twin a target sub-set of edge-nodes that are likely to capture data points relevant to assess the impact of the deployed modification. The AI engine may be further configured to activate the target sub-set of edge-nodes, capture the desired data points and assess the efficacy of the deployed modification. In some embodiments, the captured data points may provide performance metrics indicating whether a deployed modification to the datacenter has failed to achieve a threshold improvement to datacenter operations. The AI engine may be further configured to undo the deployed modification and update the digital twin accordingly.

In some embodiments, the digital twin may be segmented into a plurality of operational layers. Each layer may represent a different logical operational layer of the datacenter. Each operational layer may simulate a target functionality of the datacenter. Each operational layer may include simulations of two or more components of the datacenter. The different logical operational layers of the datacenter may, for example, include a data layer, a data infrastructure layer, a security layer, and/or a container layer.

The digital twin may simulate different network layers associated with the datacenter. Illustrative network layers may include a data layer, a data infrastructure layer, a security layer, and/or any other suitable network layer. A digital twin or, in some embodiments, two or more digital twins, may be built in accordance with different virtual layers of a datacenter (e.g., a heuristic layer, container layer, etc.).

An artificial intelligence ("AI") method for building a digital twin of a datacenter is provided. The method may include monitoring incoming and outgoing data traffic patterns associated with the datacenter. The monitoring may be performed by one or more edge-nodes. The edge-nodes may be deployed to monitor communication between equipment installed in the datacenter.

The edge-nodes may collect data points associated with data traffic carried by networks within the datacenter. Such illustrative monitored data points may include ingress interface, source IP address, destination IP address, IP protocol, source port, destination port and IP type of service. Based on the captured data points, the AI engine may determine source and destination of data traffic, class of service requested/provided, and identify causes of data traffic congestion.

The edge-nodes may collect data points associated with data traffic received or transmitted by a server within the datacenter. Such an edge-node may reside on the server and monitor activity on the server. Illustrative monitored server activity data points may include logins, logouts, file access and use of a peripheral device connected to the host.

The edge-nodes may collect data points associated with data traffic received or transmitted by a service provided by an application within the datacenter. Edge-nodes monitoring applications may capture data points generated by a particular application process such as email messages sent, or HTTP requests served.

Data points captured by the edge-nodes may be processed by the AI engine. Based on the monitoring and associated processing, the method may include identifying a plurality of target data traffic intersections. The data traffic intersections may correspond to an interaction point of two or more components of a system within the datacenter. The data traffic intersections may correspond to an interaction point of two or more systems of the datacenter.

In some embodiments, the data traffic intersections may be identified based on a design plan associated with the datacenter. For example, a design plan for a datacenter may specify how systems interact with each other. The design plan may specify how datacenter system components (e.g., individual servers, disk arrays, switches, routers, gateways, firewalls) interact with each other. The data traffic intersections may be identified based on the design plan.

An illustrative datacenter design plan includes ANSI/TIA-942 Telecommunications Infrastructure Standard for Data Centers published by the Telecommunications Industry Association ("TIA") of Arlington, Virginia and available at www.tiaonline.org. For example, the aforementioned ANSI/TIA-942 standard defines telecommunications infrastructure for a datacenter, including inter-equipment connectors, cables, distribution hardware, power distribution systems, HVAC systems, security systems and administration protocols. Based on the datacenter design plan, the AI engine may identify data traffic intersections associated with the datacenter.

At a target data traffic intersection, the method may include deploying an edge-node that records data traffic at the target intersection. The edge-node may also be configured to perform at least one level of real-time data integration on the recorded data points. The at least one level of real-time data integration may include filtering data points received at the target intersection. The filtering may eliminate undesirable data points that do not meet an operational goal of the AI engine.

The at least one level of real-time data integration may include converting recorded data points into a common format that is processable by the AI engine. The target data traffic intersection may be one of a plurality of target data traffic intersections. Data points recorded by an edge-node at each of the target data traffic intersections may be converted into a common format before forwarding the data traffic to the AI engine.

The edge-nodes may be deployed at data traffic intersections associated with a target datacenter component such as a load balancer, a local traffic manager, a global traffic manager, a webserver, a data-server, a network-server, or a network switch. The method may include feeding the captured data points and any associated real-time data integration performed by the edge-node to the AI engine. The AI engine may construct a digital twin of the datacenter based on the captured data points.

The edge-nodes may batch recorded data points before feeding the recorded data points to the AI engine. Each edge-node may be configured to coordinate batching of the recorded data points with a plurality of other edge-nodes that are deployed, collectively at each of the target data traffic intersections. The collective batching of captured data points may prevent overloading of computational power of the AI engine.

Utilizing a plurality of independent edge-nodes to capture and process the data points does not usurp functionality capabilities of the datacenter and allows the datacenter to maintain a threshold level of service while the AI engine is building the digital twin. The edge-nodes capture the data points and transmit them directly to the AI engine, bypassing any processing that would have been required had the data points been first stored within the datacenter. The edge-node architecture allows for the capture of large quantities of data points needed to build a digital twin without overloading capabilities or degrading quality of service provided by the datacenter.

An artificial intelligence ("AI") system for building a digital twin of a datacenter is provided. The system may include a plurality of edge-nodes. Each of the edge-nodes may be configured to capture data points from one or more infrastructure components of the datacenter.

Each of the edge-nodes may filter captured data points before transmitting the captured data points to an AI engine. Each of the edge-nodes may be configured to convert captured data points into a common format before transmitting the captured data points to the AI engine. After performing any localized data integration tasks, each of the edge-nodes may be configured to transmit the captured data points to the AI engine.

Based on the captured data points, the AI engine may be configured to build a digital twin for one or more of the datacenter infrastructure components. Illustrative datacenter infrastructure components may include a storage system of the datacenter, a computer server system of the datacenter and a communication system of the datacenter. Other illustrative infrastructure components may include an electrical power system of the datacenter, an environmental control system of the datacenter and a data security system of the datacenter.

The digital twin may provide simulated visibility regarding the interaction of the one or more infrastructure components. The digital twin may provide insight into how performance of the datacenter can be improved, based on how different infrastructure components interact. The AI engine may be further configured to build at least one digital asset twin. The AI engine may build two or more digital asset twins. A digital asset twin may simulate interaction of two or more of the digital component twins.

For example, the AI engine may be configured to build the at least one digital asset twin that simulates a load balancing application delivery controller. The AI engine may be configured to build at least one digital asset twin that simulates a containerization process within the datacenter. A containerization process may include isolating applications and containing them in clearly delineated memory spaces associated with a shared operating system.

The simulated containerization process may provide insight into how a service is provided by the datacenter. Containerization processes have been associated with improvements in datacenter performance, and the digital twin may provide further performance improvements. The digital twin may provide insight into how the datacenter can leverage the containerization process to efficiently utilize different cloud computing environments for different applications or services.

A method for building a digital twin of a datacenter using edge-node computing is provided. The method may include using a plurality of edge-nodes to collect telemetry data points from two or more infrastructure components of the datacenter. The method may include performing at least one real-time data integration task at each of the edge-nodes before the edge-node forwards captured data points. The real-time data integration task may be performed using two or more edge-nodes working in tandem. Utilizing edge-nodes to perform the real-time data integration tasks may not have a negligible effect on computational or performance capabilities of the datacenter.

One or more of the edge-nodes may apply real-time machine learning to determine how to filter the captured telemetry data points. The edge-nodes themselves may execute the one or more machine learning algorithms to determine how to filter the telemetry data points. In some embodiments, the AI engine may execute the one or more machine learning algorithms to determine how to filter the telemetry data points. Based on execution of the one or more machine learning algorithms, the AI engine may provide filtering instructions to the one or more edge-nodes.

After executing the at least one real-time data integration or machine learning task, the method may include feeding the telemetry data points into the AI engine. The AI engine may then construct at least one digital asset twin based on the telemetry data points received from the edge-nodes. The digital asset twin may simulate how the two or more infrastructure components of the datacenter work together. The AI engine may continuously monitor the performance of the digital asset twin. Based on the ongoing performance of the digital asset twin, the AI engine may generate actionable insights to improve interaction and operation of datacenter infrastructure components.

The method may include monitoring performance of the at least one digital asset twin. The performance of the digital asset twin may be simulated based on telemetry data points continuously captured by the edge-nodes. Utilizing edge-nodes to capture the telemetry data points may offload any computational burden that would have been imposed by using datacenter infrastructure components to capture the data points. Based on the performance of the digital asset twin, the AI engine may generate improvements to the datacenter infrastructure components.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 shows illustrative infrastructure components associated with datacenter 101. FIG. 1 shows that datacenter 101 includes electrical power system 103. Electrical power system 103 may include components needed to power all aspects of datacenter 101. Electrical power system 103 may include backup power components such as generators and battery banks.

Datacenter 101 includes environmental control system 105. Environmental control system 105 may include HVAC and other components that control heating, cooling, humidity, pressure, air flow or other environmental conditions within datacenter 101. Environmental control system 105 may ensure that other systems, such as servers 107, do not overheat. High humidity may cause excessive dust which may clog ventilation fans of server 107, increasing risk that components may malfunction due to overheating.

Datacenter 101 includes servers 107. Servers 107 may include computer servers configured to perform any suitable logical operations. Servers 107 may conform to specifications produced by the Open Compute Project (www.opencompute.org) for energy efficient computing technology. Servers 107 may execute software or other applications.

Datacenter 101 includes security system 109. Security system 109 may include physical access restrictions, such as video surveillance and controls that restrict access to other systems in datacenter 101. Security system 109 may include information security equipment such as firewalls, intrusion detection systems and gateways. Security system 109 may include access control software such as encryption and authentication applications.

Storage system 111 may include databases and all other components that store, retrieve distribute, backup or archive computer or application data. Storage system 111 may include hard disk drives and solid-state drives. Storage system 111 may include direct-attached or network-attached storage. Storage system 111 may include a dedicated storage area network Communication system 113 may facilitate communication and interaction among components of datacenter 101. For example, communication system 113 may facilitate communication and interaction among servers 107. Communication system 113 may facilitate communication and interaction among components of storage system 111. Communication system 113 may facilitate communication and interaction between storage system 111 and servers 107. Communication system 113 may also transport data traffic between servers 107 and devices outside datacenter 101. Communication system 113 may include cables, network interface cards, routers, switches, gateways, multiplexers, repeaters, bridges and hubs.

FIG. 2 shows illustrative system 200. System 200 shows illustrative interaction among components of datacenter 101 (shown above in FIG. 1). System 200 shows that data traffic from outside datacenter 101 may originate from world wide web 201. The data traffic received by datacenter 101 may first be vetted by components of security system 109. Security system 109 may include hardware and software that implements a set of policies to avoid unauthorized access and misuse of datacenter 101.

After being vetted by security system 109, the received data traffic passes to communication system 113. Communication system 113 may route the received data traffic to servers 107 for processing. Servers 107 may apply one or more applications that take the received data traffic as input. Servers 107 may generate an output based on the received data traffic. The inputs and outputs may be saved in storage system 111.

Environmental control system 105 minimizes conditions that would increase the risk of an equipment failure. Electrical power system 103 provides the necessary power to components of datacenter 101.

Figure 3:
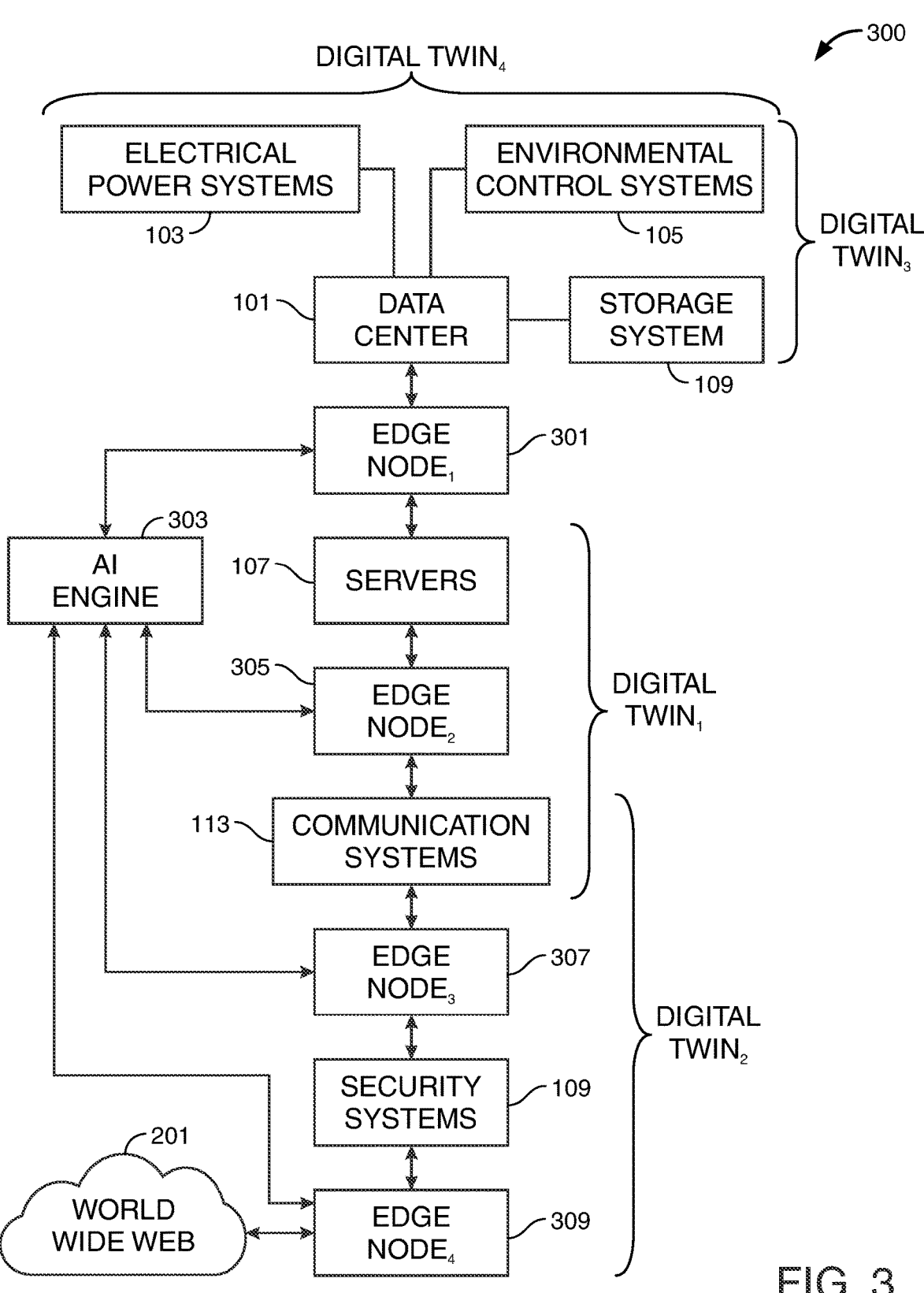
FIG. 3 shows an illustrative system in accordance with principles of the disclosure.

FIG. 3 shows illustrative system 300 and associated digital twins. FIG. 3 shows that edge-node 301 is positioned to capture data points associated with interaction of servers 107 with systems 109, 105 and 103 of datacenter 101. Edge-node 301 may monitor interactions between systems 103 and 105. Edge-node 301 may monitor interactions between systems 105 and 109. Edge-node 301 may provide captured data points to AI engine 303.

Based on the captured data points received from edge-node 301, AI engine may generate digital $twin_3$ and digital $twin_4$. Digital $twin_3$ may be a digital twin asset that models interaction between systems 105, 109 and 107 of datacenter 101. Digital $twin_4$ may be a digital twin asset that models interaction between systems 103, 105 and 107 of datacenter 101.

System 300 also includes edge-node 305. Edge-node 305 is positioned between servers 107 and communication system 113. Edge-node 305 may monitor interactions between systems 107 and 113. Edge-node 305 may provide captured data points to AI engine 303. Based on the captured data points received from edge-node 305, AI engine may generate digital $twin_1$. Digital $twin_1$ may be a digital twin asset that models interaction between systems 107 and 113 of datacenter 101.

System 300 includes edge-node 307. Edge-node 307 is positioned between communication system 113 and security system 109. Edge-node 307 may monitor interactions between systems 113 and 109. System 300 also includes edge-node 309 positioned between security system 109 and world wide web 201. Edge-node 309 may monitor incoming data traffic from world wide web 201. Edge-node 309 may monitor incoming data traffic from world wide web 201 that is rejected and/or accepted by security system 109. Edge-node 309 may monitor outgoing data traffic that is transferred from datacenter 101 onto world wide web 201.

Edge-nodes 307 and 309 may provide their captured data points to AI engine 303. Based on the captured data points received from edge-nodes 307 and 309, AI engine may generate digital $twin_2$. Digital $twin_2$ may be a digital twin system that models interaction between three or more infrastructure components of datacenter 101.

Figure 4:
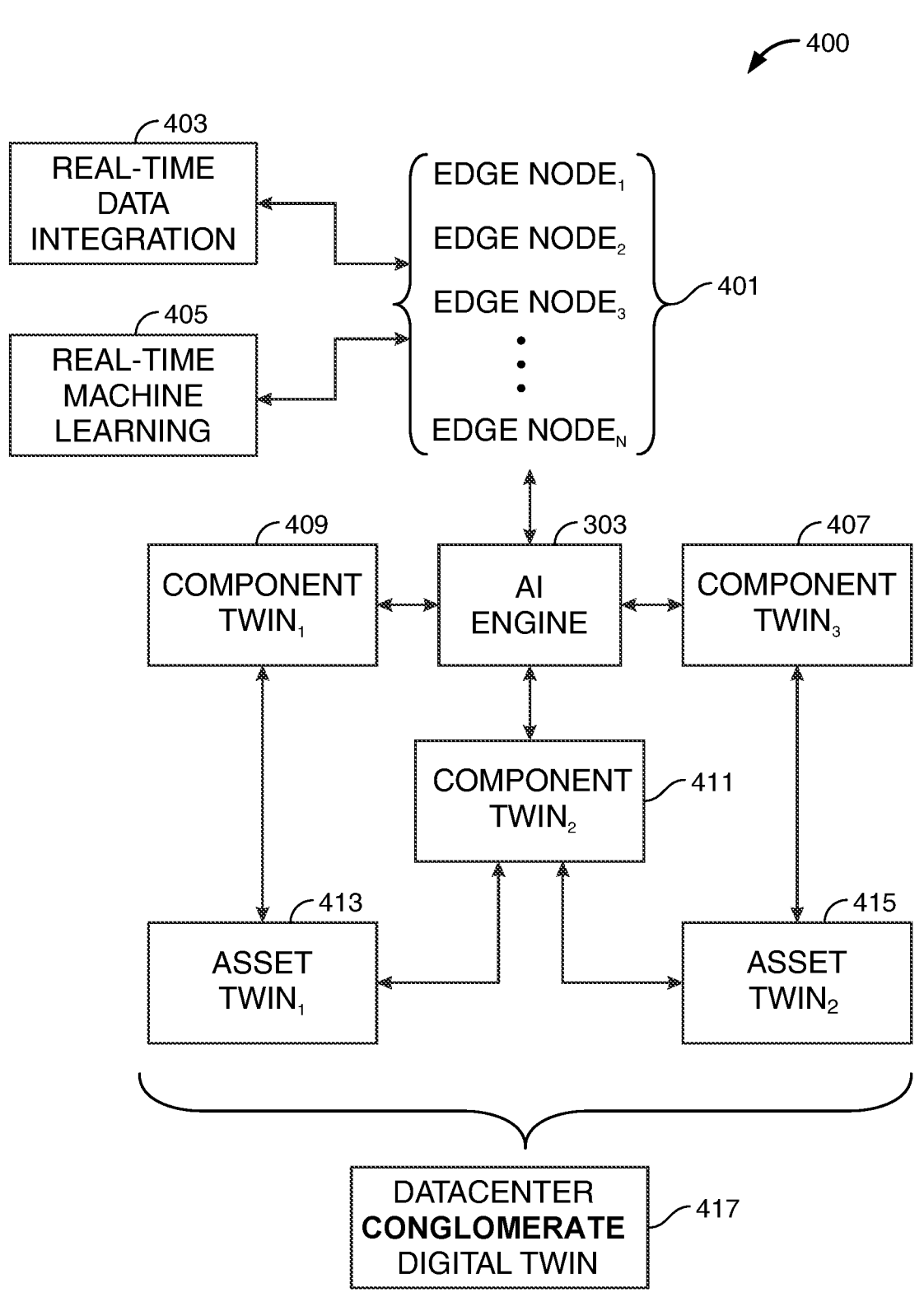
FIG. 4 shows an illustrative system in accordance with principles of the disclosure.

FIG. 4 shows illustrative digital twin architecture 400. FIG. 4 shows how AI engine 303 may construct conglomerate digital 417 of datacenter 101 (shown in FIG. 1). Architecture 400 shows that edge-nodes 401 may be deployed across the infrastructure components (shown in FIG. 1) of datacenter 101. Each of edge-nodes 401 may perform real-time data integration 403 and/or real-time machine learning 405. Real-time data integration 403 and/or real-time machine learning 405 may streamline creation of conglomerate digital twin 417 by having edge-nodes 401 process captured data points before forwarding them to AI engine 303.

Based on data points received from edge-nodes 401, AI engine 303 may construct component digital twins and asset digital twins. Architecture 400 shows that AI engine 303 has constructed component digital twins 407, 409 and 411. A component digital twin may simulate function of a target infrastructure component within a datacenter. For example, a component digital twin may model performance of a single server or router. Component digital twins 407, 409 and 411 may be combined to form asset digital twins 413 and 415. An asset digital twin may simulate interaction of two or more infrastructure components of datacenter 101.

For example, architecture 400 shows that component digital twins 409 and 411 are used to form asset digital twin 413. Architecture 400 also shows that asset digital twin 413 is based on component digital twins 411 and 407. Collectively, the various digital twins generated by AI engine 303 may form conglomerate digital twin 417 that models performance and functionality of datacenter 101.

Figure 5:
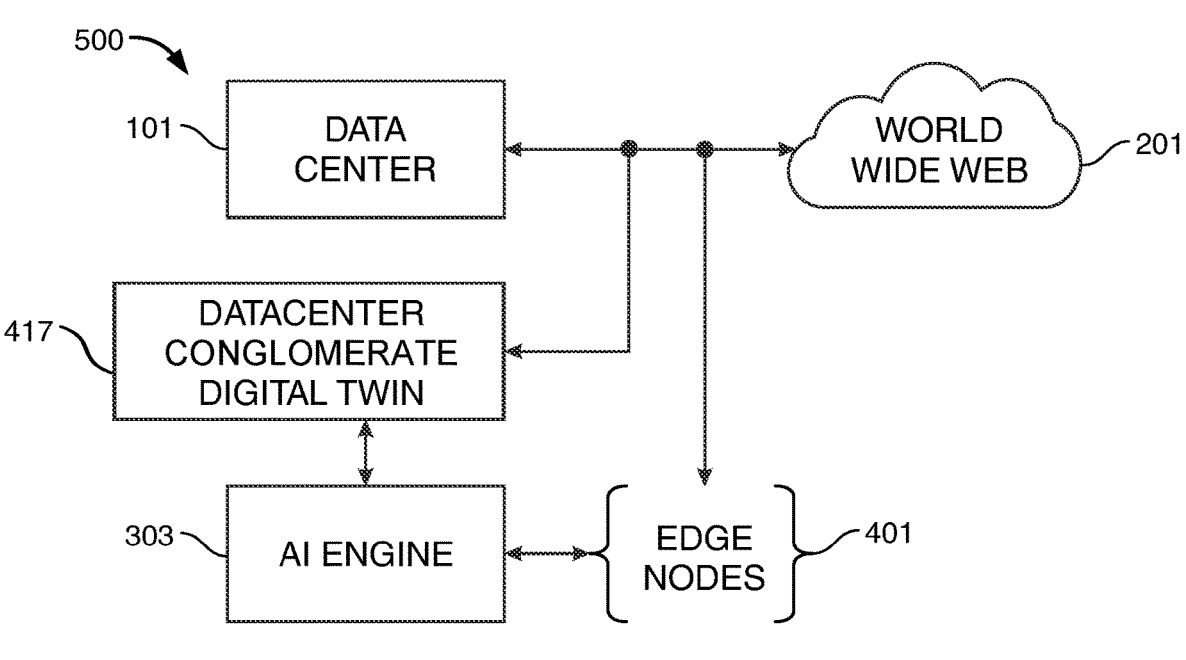
FIG. 5 shows an illustrative system in accordance with principles of the disclosure.

FIG. 5 shows illustrative system architecture 500. Architecture 500 shows that utilizing edge-nodes 401 to build and maintain digital twin 417 may not degrade performance of datacenter 101. Architecture 500 shows that edge-nodes 401 may capture data points in parallel with data traffic flowing between world wide web 201 and datacenter 101. Architecture 500 also shows that AI engine 303 may process the captured data points without utilizing resources of datacenter 101. AI engine 303 may also independently monitor activity of conglomerate digital twin 417 and provide updated data points to digital twin 417 without utilizing resources of datacenter 101.

Figure 6:
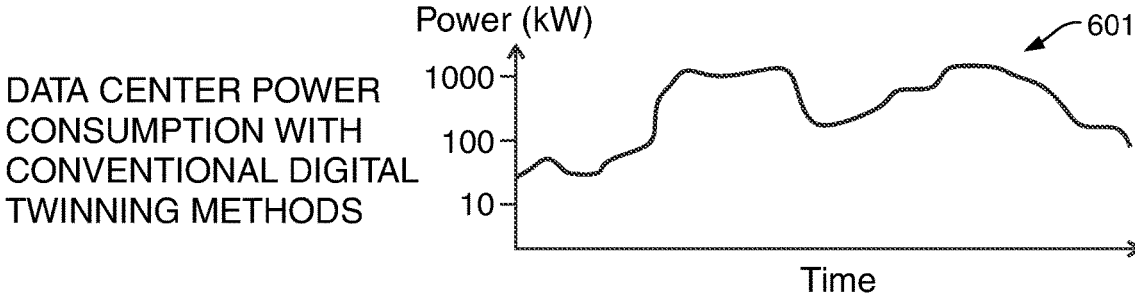
FIG. 6 shows illustrative power consumption graphs in accordance with principles of the disclosure.
Figure 6:
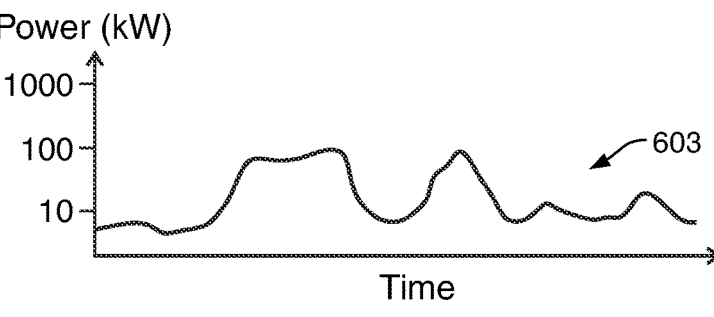

FIG. 6 shows illustrative power consumption graphs 601 and 603. Consumption graph 601 shows illustrative datacenter power consumption associated with conventional digital twinning methods. Consumption graph 603 shows illustrative datacenter power consumption associated with edge-node digital twinning methods. Consumption graphs 603 and 601 show that the datacenter consumes more power using conventional digital twinning methods compared to using edge-node digital twinning methods. The power consumption saving may be due to the edge-nodes being deployed to target data traffic intersections within datacenter and applying real-time data integration methods before forwarding captured data points to AI engine 303.

Thus, apparatus and methods for AUTOMONOUS DIGITAL TWIN GENERATION USING EDGE-NODES are provided. Persons skilled in the art will appreciate that the present disclosure can be practiced by other than the described embodiments, which are presented for purposes of illustration rather than of limitation. The present disclosure is limited only by the claims that follow.

What is claimed is:

1. An artificial intelligence ("AI") system for building a component level digital twin of a datacenter, the system comprising:

a plurality of edge-nodes that:

capture data traffic from one or more infrastructure components of the datacenter; and transmit the captured data traffic to an AI engine; and based on the captured data traffic, the AI engine is configured to build a digital component twin for each of the one or more infrastructure components, said digital component twin that replicates the one or more infrastructure components, said AI engine being configured to build the digital component twin by:

identifying usage patterns of the digital component twin installed in the datacenter, said usage patterns being derived from the data traffic; and generating a model that reflects usage of the digital component twin within the datacenter;

wherein the one or more infrastructure components comprise:

a storage system of the datacenter;

a computer server system of the datacenter; and a communication system of the datacenter.

2. The AI system of claim 1 wherein the one or more infrastructure components comprise:

an electrical power system of the datacenter;

an environmental control system of the datacenter; and a data security system of the datacenter.

3. The AI system of claim 1, wherein each of the plurality of edge-nodes is configured to filter captured data traffic before transmitting the captured data traffic to the AI engine.

4. The AI system of claim 1, wherein each of the plurality of edge-nodes is configured to convert captured data traffic into a common format before transmitting the captured data traffic to the AI engine.

5. The AI system of claim 1, wherein the digital component twin is a first digital component twin, the AI engine is further configured to build at least one asset twin that simulates interaction of the first digital component twin and a second digital component twin.

6. The AI system of claim 5 wherein the AI engine is configured to build the at least one asset twin simulates a containerization process within the datacenter.

7. The AI system of claim 6 wherein the containerization process simulates provision of a service provided by the datacenter.

8. The AI system of claim 5 wherein the AI engine is configured to build the at least one asset twin simulates a load balancing virtual application delivery controller.

* * * * *